(12) United States Patent
Okada et al.

(10) Patent No.: US 8,675,246 B2
(45) Date of Patent: Mar. 18, 2014

(54) IMAGE PROCESSING DEVICE AND PROGRAM

(75) Inventors: Aya Okada, Ibaraki-ken (JP); Shoji Kurita, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 50 days.

(21) Appl. No.: 13/441,748

(22) Filed: Apr. 6, 2012

(65) Prior Publication Data

US 2012/0257221 A1    Oct. 11, 2012

(30) Foreign Application Priority Data

Apr. 7, 2011 (JP) ................................ 2011-085537

(51) Int. Cl.
 *G06F 15/00* (2006.01)
(52) U.S. Cl.
 USPC ............. 358/1.2; 358/1.9; 358/505; 358/474
(58) Field of Classification Search
 USPC .................... 358/1.2, 1.9, 505, 474
 See application file for complete search history.

(56) References Cited

U.S. PATENT DOCUMENTS

2006/0193513 A1* 8/2006 Minamino ..................... 382/165
2011/0228361 A1* 9/2011 Ohkawa .......................... 358/505

FOREIGN PATENT DOCUMENTS

JP        03-064268 A      3/1991

* cited by examiner

*Primary Examiner* — Houshang Safaipour
(74) *Attorney, Agent, or Firm* — Studebaker & Brackett PC

(57) ABSTRACT

An image processing device for determining whether to carry out color printing or monochrome printing to achieve a printing operation on a print sheet based on an original document, the device including: a determination area obtaining unit configured to automatically obtain a partial area of the original document estimated to be printed on the print sheet; and a color/monochrome determination unit configured to carry out the determination with using image data of the obtained partial area.

3 Claims, 3 Drawing Sheets

IMAGE PROCESSING DEVICE AND PROGRAM

BACKGROUND OF THE INVENTION

1. Field of the Invention

The present invention relates to an image processing device and an image processing program for determining whether to carry out color printing or monochrome printing to achieve a printing operation on a print sheet based on an original document.

2. Description of the Related Art

Conventionally, techniques for use with printing apparatuses to automatically determine whether an original document is a color document or a black and white document are known, where, if it is determined that the original document is a color document, printing is carried out with using inks of three colors of CMY, and if it is determined that the original document is a black and white document, printing is carried out with using an ink of a single color of K (black).

When a printing operation on a print sheet based on an original document is carried out, there may be cases where only a part of the original document is actually printed on the print sheet. For example, in a case where 1:1 scale printing of the original document is carried out with specifying a print sheet of a size smaller than the size of the original document, an actually printed part of the original document is a part of the original document corresponding to the size of the print sheet. Further, even in a case where printing is carried out with specifying a print sheet of the same size as the size of the original document, if a margin, where no image is to be printed, is present on the print sheet, the size of an area available for printing is smaller than the size of the original document, and therefore only a part of the original document is actually printed.

In such situations, the above-described conventional printing apparatuses, which determines whether to carry out color printing or black and white printing based on image data of the entire original document, carry out printing with using inks of three colors of CMY whenever it is determined that the entire original document is a color document even if an actually printed part of the original document does not contain a part that is recognized as a color document (color part). In this case, color inks are used to print a substantially black-and-white image (so-called composite black), resulting in waste of printing costs.

For example, Japanese Unexamined Patent Publication No. 1-103 (1991)-64268 (which will hereinafter be referred to as Patent Document 1) proposes that an area of an original document to be used for determining whether to carry out color printing or black and white printing is specified by the user, and the color/black-and-white determination is carried out with using only image data of the specified area. However, this method requires the user to directly specify an area of the original document to be used for the color/black-and-white determination every time printing is carried out, and thus forces the user to perform a troublesome operation.

SUMMARY OF THE INVENTION

In view of the above-described circumstances, the present invention is directed to providing an image processing device and an image processing program where, when a printing operation on a print sheet based on an original document is carried out, a printing mode (color printing or monochrome printing) suitable for a color state of a part of the original document actually printed on the print sheet can be selected without requiring manual operation by the user.

As aspect of the image processing device of the invention is an image processing device for determining whether to carryout color printing or monochrome printing to achieve a printing operation on a print sheet based on an original document, the device including: a determination area obtaining unit configured to automatically obtain a partial area of the original document estimated to be printed on the print sheet; and a color/monochrome determination unit configured to carry out the determination with using image data of the obtained partial area.

The "monochrome printing" herein refers to printing with an ink of a single color, such as simple black and white printing or grayscale printing.

The determination area obtaining unit may obtain the partial area estimated to be printed on the print sheet based on a size of the print sheet.

The determination area obtaining unit may obtain, as the partial area estimated to be printed on the print sheet, an area having the size of the print sheet located at a predetermined position of the original document.

The "predetermined position of the original document" herein refers to a position of a part that is set in advance to be printed when a part of the original document is printed. The predetermined position may be set arbitrarily, such as the upper-left end portion or the upper end center portion of the original document.

In a case where the printing operation is carried out with setting a partial area of the print sheet available for printing, the determination area obtaining unit may obtain, as the partial area estimated to be printed on the print sheet, an area corresponding to the set partial area available for printing in an area having the size of the print sheet located at a predetermined position of the original document.

The "partial area available for printing" herein refers to an area excluding an area (margin) that is set in advance as an area unavailable for printing of the print sheet. The partial area available for printing may be set by automatically or manually setting the margin.

In a case where the printing operation is carried out with setting a scaling factor for enlargement or reduction, the determination area obtaining unit may obtain, as the partial area estimated to be printed on the print sheet, an area having a size obtained by dividing the size of the print sheet with the set scaling factor for enlargement or reduction located at a predetermined position of the original document.

In a case where the printing operation is carried out with setting a partial area of the print sheet available for printing and a scaling factor for enlargement or reduction, the determination area obtaining unit may obtain, as the partial area estimated to be printed on the print sheet, an area corresponding to the set partial area available for printing in an area having a size obtained by dividing the size of the print sheet with the set scaling factor for enlargement or reduction located at a predetermined position of the original document.

An aspect of the image processing program of the invention is a program for causing a computer to function as the above-described image processing device.

According to the image processing device and program of the invention, when a printing operation on a print sheet based on an original document is carried out, a partial area, which is estimated to be printed on the print sheet, of the original document is automatically obtained, and whether to carry out color printing or monochrome printing to achieve the printing operation is determined based on image data of the obtained partial area. Therefore, the color/monochrome determination can be achieved with using the image data of the partial area of a range that is the same as or close to an actually printed part of the original document, rather than the image data of the entire original document, thereby allowing selection of a printing mode (color printing or monochrome printing) that is more suitable for the color state of the actually printed part than in the case where the color/monochrome determination is made with using the image data of the entire original document. As a result, printing costs can be reduced. Further, since the image processing device and program of the invention do not require manual operation by the user, improved convenience can be provided when compared to the method disclosed in Patent Document 1.

With the above-described image processing device and program, in a case where the partial area estimated to be printed on the print sheet is obtained with taking setting of a partial area of the print sheet available for printing and/or setting of a scaling factor for enlargement or reduction into account in addition to the size of the print sheet, the color/monochrome determination can be achieved based on image data of the partial area of a range which is even closer to the actually printed part of the original document.

DESCRIPTION OF THE PREFERRED EMBODIMENTS

Figure 1:
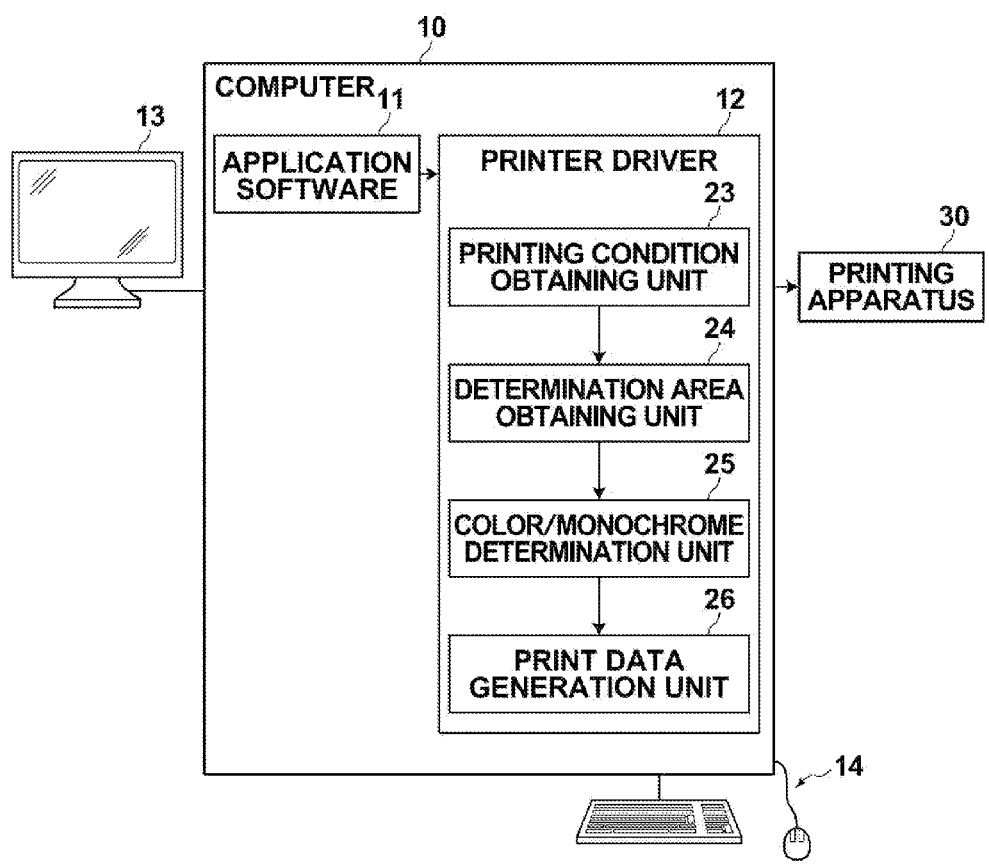
FIG. 1 is a diagram illustrating the schematic configuration of a printing system.

Hereinafter, an embodiment of an image processing device and an image processing program of the present invention will be described with reference to the drawings. FIG. 1 is a block diagram illustrating the schematic configuration of a printing system employing the image processing device of the invention. As shown in FIG. 1, this printing system includes a computer 10 and a printing apparatus 30, which is connected to the computer 10 via a network, such as a wired or wireless LAN.

The printing apparatus 30 receives print data from the computer 10 via the network and carries out printing on a print sheet based on the received print data. The printing apparatus 30 may, for example, be one that carries out screen printing, inkjet printing or laser printing on a print sheet.

The computer 10 includes hardware devices, such as a central processing unit (CPU) and a storage device (such as a semiconductor memory, hard disk, SSD, or the like), and has programs, such as an application software 11, a printer driver 12, etc., installed thereon. The printer driver 12 corresponds to the image processing program of the invention, and the computer 10 with the printer driver 12 installed thereon corresponds to the image processing device of the invention. The computer 10 further includes a display unit 13, such as a monitor, and an operation unit 14, such as a keyboard and a mouse.

The application software 11 is a program, such as a memo pad application or Word®, which allows the user to generate original document data (such as text, image, etc.) The original document data generated with the application software 11 is outputted to the printer driver 12 in response to an instruction to print the original document by the user.

In response to the instruction to print the original document by the user, the printer driver 12 generates raster print data, which can be handled by the printing apparatus 30, based on the original document data outputted from the application software 11 and various printing conditions, such as print sheet size (A4, B5, L, postcard, etc.), margin size and scaling factor for enlargement or reduction, and outputs the print data to the printing apparatus 20. As shown in FIG. 1, the printer driver 12 includes a printing condition obtaining unit 23, a determination area obtaining unit 24, a color/monochrome determination unit 25 and a print data generation unit 26.

The printing condition obtaining unit 23 may access a memory (not shown) where default printing conditions are stored to obtain the printing conditions, or the printing condition obtaining unit 23 may include a user interface to receive an input of printing conditions by the user and obtain the printing conditions received via the user interface. The printing conditions include information, such as the print sheet size, the margin size, the scaling factor, etc.

The determination area obtaining unit 24 obtains a partial area (which will hereinafter be referred to as "determination area") of the original document, which is estimated to be printed on a print sheet based on the printing conditions, such as the print sheet size, the margin size, the scaling factor, etc., obtained by the printing condition obtaining unit 23. Specifically, in an area having a size obtained by dividing the print sheet size with the scaling factor located at a predetermined position of the original document, an area corresponding to an area excluding the margin (a partial area available for printing) is obtained as the determination area. The predetermined position herein refers to a position of a part that is set in advance to be printed when apart of the original document is printed, such as an upper-left end portion, an upper end center portion, or the like, of the original document. The size of the determination area can be calculated according to the Expression below:

(Print sheet size−Margin size)/Scaling factor.

Figure 2:
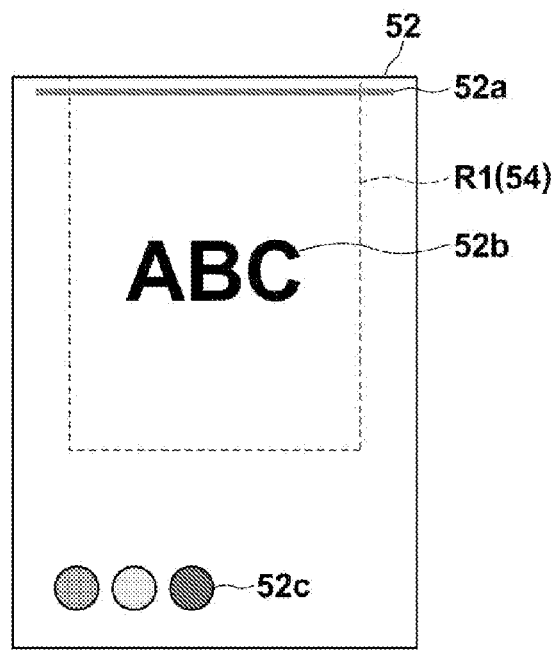
FIG. 2 is a diagram for explaining a process for obtaining a determination area (printing condition 1)

Now, specific examples of a process for obtaining the determination area are described. It is assumed here that a printing operation is carried out based on an original document 52, as shown in FIG. 2, which is an A3 size image (with a length in the top-bottom direction of 420 mm and a length in the left-right direction of 297 mm) including parts 52a and 52c formed by color pixels and a part 52b formed by black (and/or gray) pixels, under each of printing conditions 1 to 5 described below. Further, it is assumed here that the upper end center portion of the original document is set as the predetermined position.

Printing Condition 1

As shown in FIG. 2, in a case where the print sheet size is A5 (with a length in the top-bottom direction of 210 mm and a length in the left-right direction of 148 mm), the margin size set for the print sheet is 0 mm at all of the top, bottom, left and right ends, and the scaling factor is 100%, the determination area obtaining unit 24 obtains, as a determination area R1, an area 54 of A5 size (i.e., the print sheet size) located at the upper end center portion of the original document 52. Since the determination area R1 includes the part 52a formed by color pixels, as shown in FIG. 2, the color/monochrome determination unit 25, which will be described later, determines to carry out color printing to achieve this printing operation.

Printing Condition 2

Figure 3:
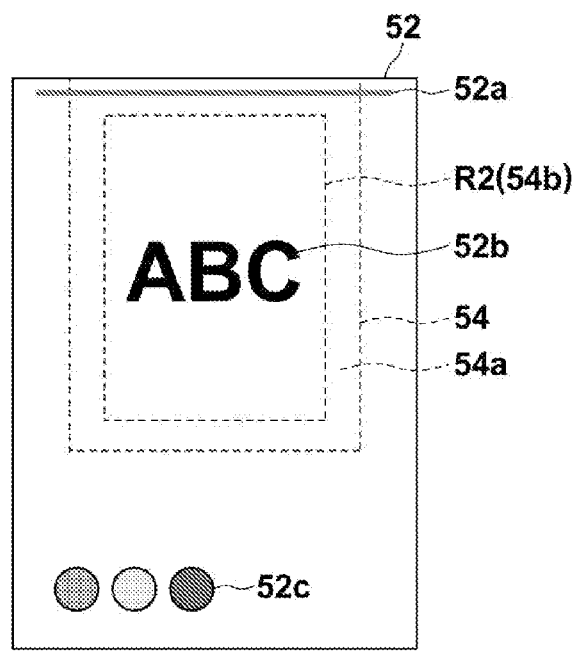
FIG. 3 is a diagram for explaining a process for obtaining a determination area (printing condition 2)

As shown in FIG. 3, in a case where the print sheet size is A5, the margin size set for the print sheet is 2 mm at all of the top, bottom, left and right ends, and the scaling factor is 100%, the determination area obtaining unit 24 obtains, as a determination area R2, an area corresponding to an area excluding the margin of 2 mm at the top, bottom, left and right ends of the print sheet in the area 54 of A5 size located at the upper end center portion of the original document 52, i.e., an area 54b (with a length in the top-bottom direction of 206 mm and a length in the left-right direction of 144 mm) excluding an end area 52a with the width of 2 mm inward from the top, bottom, left and right ends of the area 54. Since the determination area R2 includes none of the parts 52a and 52c formed by color pixels, as shown in FIG. 3, the color/monochrome determination unit 25, which will be described later, determines to carry out black and white printing to achieve this printing operation.

Printing Condition 3

In a case where the print sheet size is A5, the margin size set for the print sheet is 4 mm at the top and bottom ends and 2 mm at the left and right ends, and the scaling factor is 100%, the determination area obtaining unit 24 obtains, as the determination area, an area corresponding to an area excluding the margin of 4 mm at the top and bottom ends and 2 mm at the left and right ends of the print sheet in the area 54 of A5 size located at the upper end center portion of the original document 52, i.e., an area (with a length in the top-bottom direction of 202 mm and a length in the left-right direction of 144 mm) excluding an area with the width of 4 mm inward from the top and bottom ends and the width of 2 mm inward from the left and right ends of the area 54.

Printing Condition 4

In a case where the print sheet size is A5, the margin size set for the print sheet is 0 mm at all of the top, bottom, left and right ends, and the scaling factor is 50%, the determination area obtaining unit 24 obtains, as the determination area, an area with a length in the top-bottom direction of 420 mm and a length in the left-right direction of 296 mm (an area having a size obtained by dividing the print sheet size of A5 with the scaling factor of 50%) located at the upper end center portion of the original document 52.

Printing Condition 5

Figure 4:
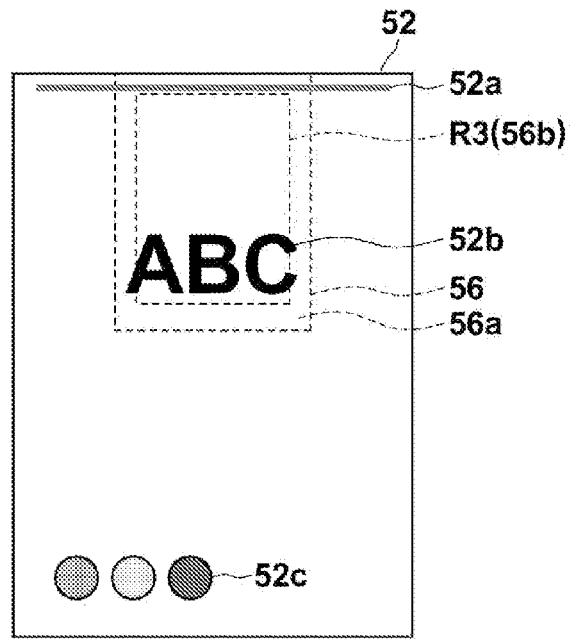
FIG. 4 is a diagram for explaining a process for obtaining a determination area (printing condition 5)

As shown in FIG. 4, in a case where the print sheet size is A5, the margin size set for the print sheet is 2 mm at all of the top, bottom, left and right ends, and the scaling factor is 200%, the determination area obtaining unit 24 obtains, as a determination area R3, an area corresponding to an area excluding the margin of 2 mm at the top, bottom, left and right ends of the print sheet in an area 56 with a length in the top-bottom direction of 105 mm and a length in the left-right direction of 74 mm (an area having a size obtained by dividing the print sheet size of A5 with the scaling factor of 200%) located at the upper end center portion of the original document 52, i.e., an area 56b (with a length in the top-bottom direction of 103 mm and a length in the left-right direction of 72 mm) excluding an end area 56a with the width of 1 mm (a size obtained by dividing the margin size of 2 mm with the scaling factor of 200%) inward from the top, bottom, left and right ends of the area 56. Since the determination area R3 includes none of the parts 52a and 52c formed by color pixels, as shown in FIG. 4, the color/monochrome determination unit 25, which will be described later, determines to carry out black and white printing to achieve this printing operation.

The color/monochrome determination unit 25 determines whether to carry out color printing or monochrome printing (black and white printing in this example) based on image data of the determination area obtained by the determination area obtaining unit 24. Specifically, in a case where the image data of the original document is RGB data, for example, the color/monochrome determination unit 25 determines whether each pixel of the image data of the determination area is a color pixel or a black-and-white pixel based on a balance among RGB values of the pixel. If the number of pixels determined to be color pixels is not smaller than a predetermined threshold value, the color/monochrome determination unit 25 determines to carry out color printing to achieve the printing operation. In contrast, if the number of pixels determined to be color pixels is smaller than the predetermined threshold value, the color/monochrome determination unit 25 determines to carry out black and white printing to achieve the printing operation. The predetermined threshold value may be set arbitrarily, such as the number of pixels forming an area having a size corresponding to a seal or a stamp. If it is desired to carry out color printing when there is at least one color pixel, the predetermined threshold value is set at 1.

Further, in a case where the color/monochrome determination unit 25 determines whether or not to carry out monochrome printing with a color other than K (i.e., monochrome printing with any one of C, M and Y), a determination may be made as to whether or not all the pixels in the determination area can be printed with a recording material of a single color among recording materials charged in the printing apparatus. Alternatively, a determination may be made as to whether or not the number of pixels that can be printed with a recording material of a single color among the recording materials charged in the printing apparatus is not smaller than a predetermined threshold value. These determinations may be made based on CMYK conversion data, rather than the RGB data.

The print data generation unit 26 generates raster print data (CMYK data, for example) based on the printing conditions, such as the print sheet size, the margin size and the scaling factor, obtained by printing condition obtaining unit 23 and the original document data outputted from the application software 11, and outputs the print data to the printing apparatus 20. In particular, in the case where it is determined by the color/monochrome determination unit 25 to carry out color printing to achieve the printing operation, the print data generation unit 17 of this embodiment generates CMY data or CMYK data, and in the case where it is determined by the color/monochrome determination unit 25 to carry out monochrome printing operation to achieve the printing operation, the print data generation unit 17 generates any one of C, M, Y and K data (in this example, K data is generated when it is determined to carry out black and white printing).

Figure 5:
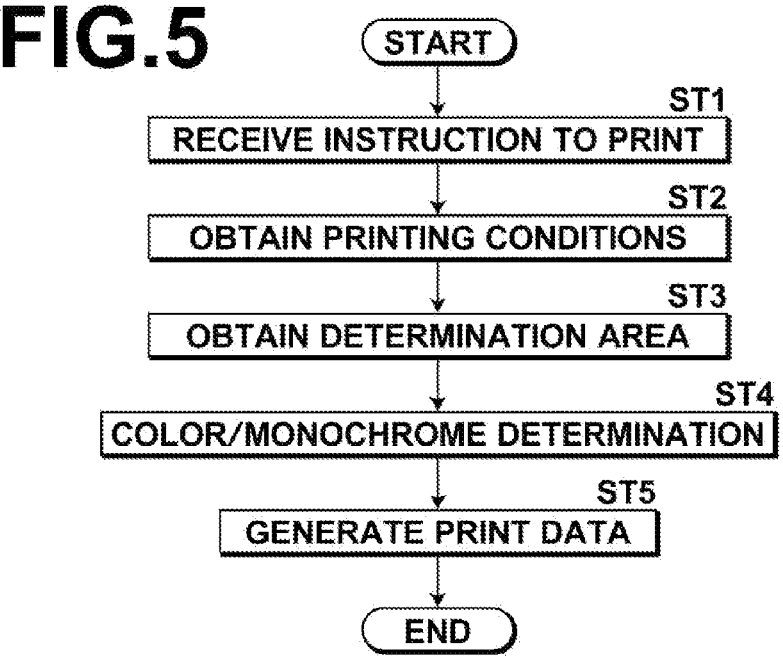
FIG. 5 is a flow chart for explaining operation of the printing system.

Now, operation of the printing system of this embodiment is described with reference to the flow chart shown in FIG. 5. First, when an instruction to print the original document data, which is generated with the application software 11, is made by the user, the original document data generated with the application software 11 is outputted from the application software 11 to the printer driver 12 (ST1). Then, the printing condition obtaining unit 23 of the printer driver 12 causes a printing condition receiving screen for receiving settings of the printing conditions, such as the print sheet size, the margin size and the scaling factor, on the monitor, and obtains the printing conditions based on operation by the user on the printing condition receiving screen (ST2).

Subsequently, the determination area obtaining unit 24 of the printer driver 12 obtains a partial area (determination area) of the original document, which is estimated to be printed on the print sheet, based on the printing conditions, such as the print sheet size, the margin size and the scaling factor, obtained by the printing condition obtaining unit 23. Specifically, the determination area obtaining unit 24 obtains, as the determination area, an area corresponding to an area excluding the margin in an area having a size obtained by dividing the print sheet size with the scaling factor located at a predetermined position of the original document (ST3).

Then, the color/monochrome determination unit 25 of the printer driver 12 determines whether each pixel of the image data of the determination area obtained by the determination area obtaining unit 24 is a color pixel or a monochrome pixel (a black-and-white pixel in this example) based on a balance among RGB values of the pixel. If the number of pixels determined to be color pixels is not smaller than a predetermined threshold value, the color/monochrome determination unit 25 determines to carry out color printing to achieve the printing operation. In contrast, if the number of pixels determined to be color pixels is smaller than the predetermined threshold value, the color/monochrome determination unit 25 determines to carry out black and white printing to achieve the printing operation (ST4).

Then, the print data generation unit 26 of the printer driver 12 generates CMY or CMYK data or K data based on the printing conditions obtained by the printing condition obtaining unit 23 and the original document data outputted from the application software 11, and outputs the print data to the printing apparatus 30. In the case where it is determined by the color/monochrome determination unit 25 to carry out color printing to achieve the printing operation, CMY or CMYK data is generated, and in the case where it is determined to carry out monochrome printing operation to achieve the printing operation, K data is generated (ST5). Then, the printing apparatus 30 carries out the printing operation (color printing or monochrome (black and white) printing) based on the print data outputted from the printer driver 12.

As described above, according to this printing system, when a printing operation on a print sheet based on an original document is carried out, a partial area (determination area) of the original document, which is estimated to be printed on the print sheet, is automatically obtained based on the printing conditions, such as the print sheet size, the margin size and the scaling factor, and whether to carryout color printing or monochrome printing to achieve the printing operation is determined based on image data of the obtained determination area. Therefore, the color/monochrome determination can be achieved with using the image data of the partial area of a range that is the same as or close to an actually printed part of the original document, rather than the image data of the entire original document, thereby allowing selection of a printing mode (color printing or monochrome printing) that is more suitable for the color state of the actually printed part than in the case where the color/monochrome determination is made with using the image data of the entire original document. As a result, printing costs can be reduced.

It should be noted that, although the determination area obtaining unit 24 obtains the determination area with using all the three printing conditions including the print sheet size, the margin size and the scaling factor in the above-described embodiment, the determination area may be obtained with using only one of the print sheet size, the print sheet size and the margin size, or using only the print sheet size and the scaling factor. Specifically, in the case where the determination area is obtained based only on the print sheet size, an area having the print sheet size located at a predetermined position of the original document may be obtained as the determination area. In the case where the determination area is obtained based on the print sheet size and the margin size, an area corresponding to an area excluding the margin (an area available for printing) in an area having the print sheet size located at a predetermined position of the original document may be obtained as the determination area. In the case where the determination area is obtained based on the print sheet size and the scaling factor, an area having a size obtained by dividing the print sheet size with the scaling factor located at a predetermined position of the original document may be obtained as the determination area.

Although the printer driver 12 is included in the computer 10 in the above-described embodiment, the printer driver 12 may be a unit independent from the computer 10 or the printer driver 12 may be included in the printing apparatus 30.

Although the original document data is generated with the application software 11 in the computer 10 in the above-described embodiment, the original document data may be data obtained by reading an image of the original document with an image scanner included in the printing apparatus 30.

What is claimed is:

1. An image processing device for determining whether to carry out color printing or monochrome printing to achieve a printing operation on a print sheet based on an original document, the device comprising:
    a determination area obtaining unit configured to automatically obtain a partial area of the original document estimated to be printed on the print sheet; and
    a color/monochrome determination unit configured to carry out the determination with using image data of the obtained partial area,
    wherein the determination area obtaining unit obtains the partial area estimated to be printed on the print sheet based on a size of the print sheet, and
    wherein, in a case where the printing operation is carried out with setting a scaling factor for enlargement or reduction, the determination area obtaining unit obtains, as the partial area estimated to be printed on the print sheet, an area having a size obtained by dividing the size of the print sheet with the set scaling factor for enlargement or reduction located at a predetermined position of the original document.

2. An image processing device for determining whether to carry out color printing or monochrome printing to achieve a printing operation on a print sheet based on an original document, the device comprising:
    a determination area obtaining unit configured to automatically obtain a partial area of the original document estimated to be printed on the print sheet; and
    a color/monochrome determination unit configured to carry out the determination with using image data of the obtained partial area,
    wherein the determination area obtaining unit obtains the partial area estimated to be printed on the print sheet based on a size of the print sheet, and
    wherein, in a case where the printing operation is carried out with setting a partial area of the print sheet available for printing and a scaling factor for enlargement or reduction, the determination area obtaining unit obtains, as the partial area estimated to be printed on the print sheet, an area corresponding to the set partial area available for printing in an area having a size obtained by dividing the size of the print sheet with the set scaling factor for enlargement or reduction located at a predetermined position of the original document.

3. A non-transitory computer readable medium containing an image processing program for causing a computer to function as an image processing device for determining whether to carry out color printing or monochrome printing to achieve a printing operation on a print sheet based on an original document, the image processing program causing the computer to function as:

a determination area obtaining unit configured to automatically obtain a partial area of the original document estimated to be printed on the print sheet; and a color/monochrome determination unit configured to carry out the determination with using image data of the obtained partial area, wherein the determination area obtaining unit obtains the partial area estimated to be printed on the print sheet based on a size of the print sheet, and wherein, in a case where the printing operation is carried out with setting a scaling factor for enlargement or reduction, the determination area obtaining unit obtains, as the partial area estimated to be printed on the print sheet, an area having a size obtained by dividing the size of the print sheet with the set scaling factor for enlargement or reduction located at a predetermined position of the original document.

* * * * *